Sept. 19, 1967 S. L. POP 3,343,017
LOW INERTIA ELECTRIC MOTORS
Filed Oct. 12, 1966 9 Sheets-Sheet 1

INVENTOR.
STEPHEN L. POP
BY
Williams and Kuzski
ATTORNEYS

Sept. 19, 1967 S. L. POP 3,343,017
LOW INERTIA ELECTRIC MOTORS
Filed Oct. 12, 1966 9 Sheets-Sheet 3

INVENTOR.
STEPHEN L. POP
BY
Williams and Kasak
ATTORNEYS

INVENTOR.
STEPHEN L. POP

Sept. 19, 1967  S. L. POP  3,343,017
LOW INERTIA ELECTRIC MOTORS
Filed Oct. 12, 1966  9 Sheets-Sheet 8

FIG. 14.

INVENTOR.
STEPHEN L. POP
BY Williams and Kreske
ATTORNEYS

INVENTOR.
STEPHEN L. POP
BY
Williams and Kreake
ATTORNEYS

United States Patent Office 3,343,017
Patented Sept. 19, 1967

3,343,017
LOW INERTIA ELECTRIC MOTORS
Stephen L. Pop, Warren, Ohio, assignor to Peerless Electrical Division of H. K. Porter Company Inc., Warren, Ohio
Filed Oct. 12, 1966, Ser. No. 594,960
18 Claims. (Cl. 310—266)

ABSTRACT OF THE DISCLOSURE

A low inertia, fast response electric motor having a low mass, tubular armature in which a magnetically permeable core is non-rotatably disposed. The armature is characterized by having longitudinally extending conductors being disposed closer to the inner surface of the armature than to the outer surface thereof to provide maximum armature strength with minimum mass and thickness thereof.

The present invention relates to low-inertia, electric motors and to methods of making the same, and the principal object of the invention is to provide new and improved methods and apparatus of the character described. This application is a continuation-in-part of application SN 377,356, filed June 23, 1964, now abandoned and is assigned to the same assignee.

An ever-increasing number of applications require a driving motor capable of reaching operating speed from rest in but a fraction of a revolution and capable also of returning t orest in a like manner. While operational requirements such as these can be approached by hydraulic motors and by electric motors having clutches and brakes associated therewith, such expedients are very costly, large in size, and require considerable maintenance.

Efforts have been made in the past to produce low-inertia, electric motors; i.e., electric motors whose rotating parts are very light in weight to minimize the effects of inertia in both accelerating and decelerating the motor. Many of such prior art motors have been suitable only for light duty applications since the rotating part of the motor is cantilever mounted. In others, certain rotating parts are carried on bearings which are wholly inaccessible for service once the motor is assembled. In the last-mentioned expedient, a critical bearing failure renders the motor useless since such bearing cannot be repaired or replaced without irreparably damaging the motor in the process.

In contrast, the present invention provides a low-inertia electric motor whose rotating parts are supported by bearings at widely spaced places in accordance with the best engineering practices and which bearings are accessible for service or replacement in the manner of standard electric motors. These and other advantages will readily become apparent from a study of the following description and from the drawings appended hereto.

In the drawings accompanying this specification and forming a part of this application there is shown, for purpose of illustration, an embodiment which the invention may assume, and in these drawings.

Figure 1:
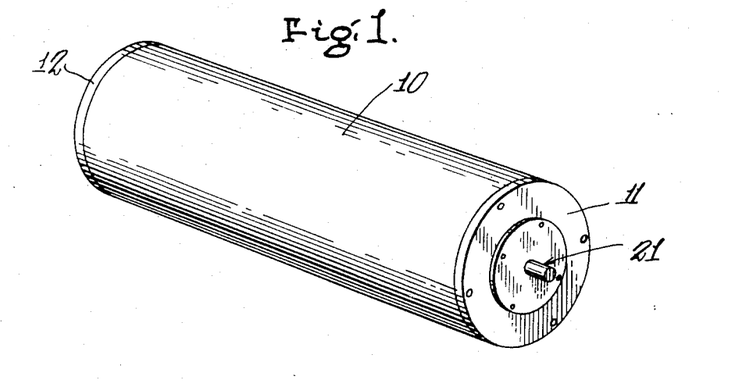
FIGURE 1 is a perspective view of a low-inertia electric motor constructed in accordance with a preferred embodiment of the present invention.
Figure 3:
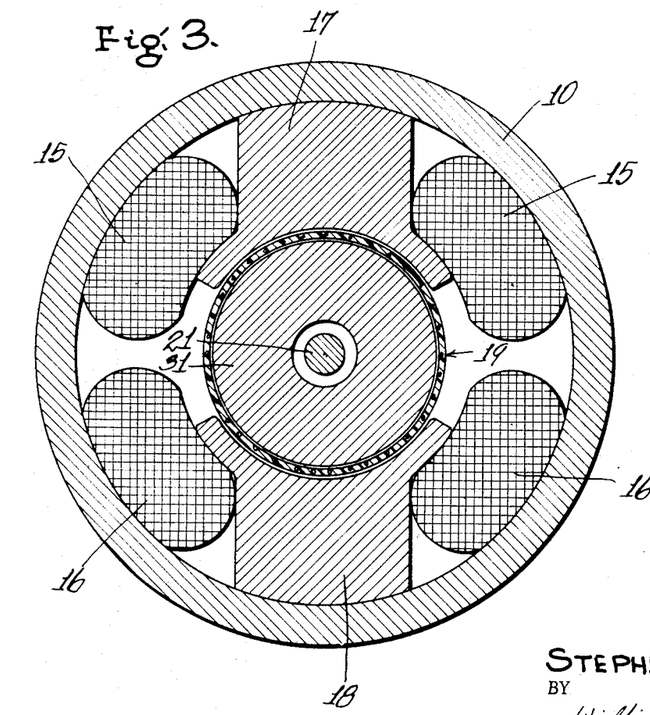
FIGURE 3 is a transverse sectional view generally corresponding to the line 3—3 of FIGURE 2.

With reference to FIGURES 1 and 3, an electric motor constructed in accordance with the present invention is conventional in that it comprises a tubular housing 10 closed by a drive end plate 11 and an opposite end plate 12 respectively secured to the housing by cap screws 13 and 14. Secured within the housing 10 are field coil windings 15 and 16 (see also FIGURE 3) associated with respective, magnetically permeable field poles 17 and 18 which are suitably anchored to the housing. Windings 15 and 16 and field poles 17 and 18 form what is commonly referred to as a stator.

Figure 2:
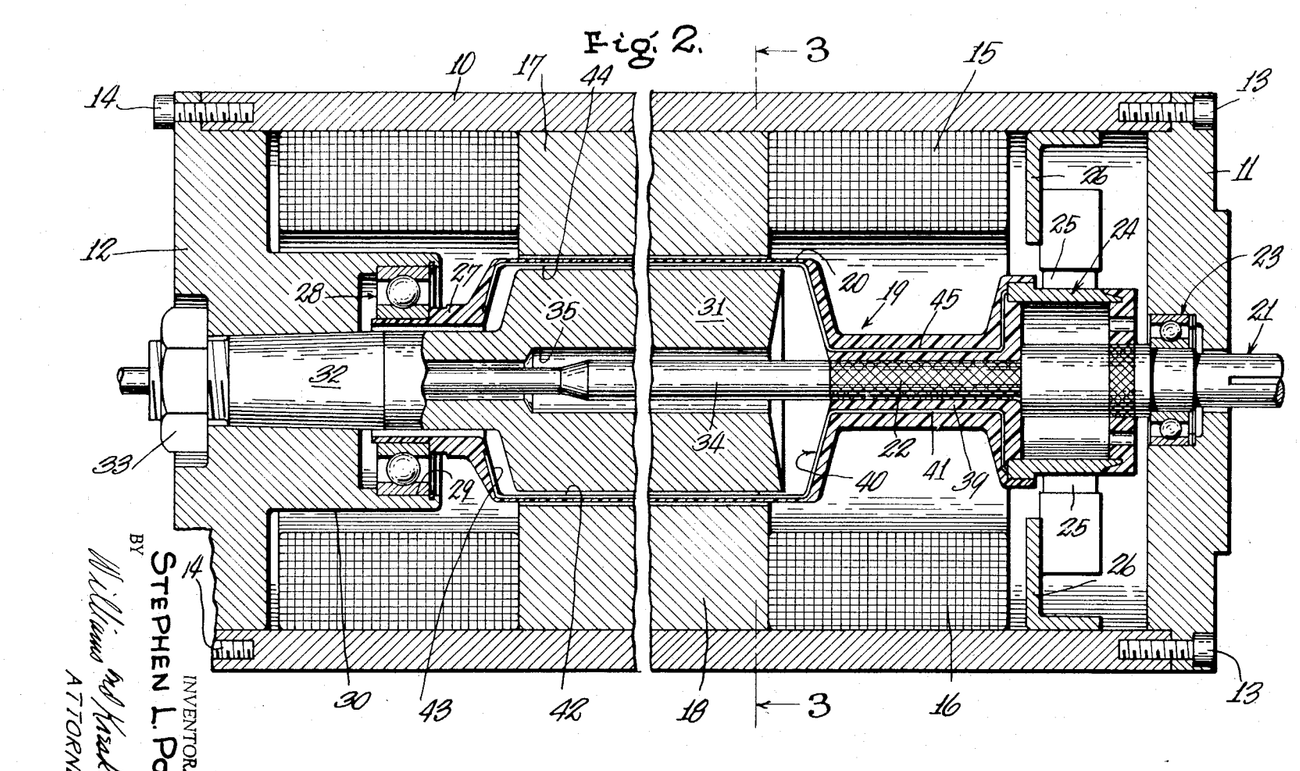
FIGURE 2 is an enlarged, broken, longitudinal sectional view through the motor seen in FIGURE 1.

As best seen in FIGURE 3, the facing portions of the field poles 17 and 18 are arcuate to provide minimum radial operating clearance for a rotating armature assembly 19 most clearly shown in FIGURE 2. As herein illustrated, the armature assembly comprises a tubular part 20, or shell, whose right end is anchored to an armature shaft 21 at 22 and such armature shaft extends through the drive end plate 11 for connection to whatever device is to be driven and is rotatably supported in such plate by a ball bearing 23. Adjacent the drive end plate 11, the armature assembly provides a commutator 24 which is engaged by the usual brushes 25 carried by brush holders 26.

The left end of armature tubular part 20 is reduced in size and provides an integral, axially extending tubular part 27 on which is mounted the inner race of a ball bearing 28. The outer race of ball bearing 28 is closely received in a bore 29 formed in an axially inwardly extending central boss 30 formed as a part of end plate 12.

Disposed within armature tubular portion 20 is a magnetically permeable cylindrical core 31 of a diameter to provide minimum radial operating clearance for the armature tubular portion 20. The left end 32 of core 31 is reduced in size to pass through the armature tubular part 27 and such end 32 is preferably tapered to closely fit within a tapered seat in the end plate 12. The extreme left end of core end 31 is threaded to receive a nut 33 which tightly secures the core to the end plate 12.

In the present embodiment, armature shaft 21 has a stepped diameter extension 34 which passes through a stepped diameter, central aperture 35 in the core 31, the shaft extension 34 providing, in this instance, a drive for a tachometer. For a purpose to appear, the right end of core 31 and the left end of the enlarged portion of the core aperture 35 are tapered in funnel-like fashion.

Since the core 31 is too large to pass through the armature tubular part 27, it will be evident that the core and the armature 19 cannot be made separately and then assembled. The method of manfuacture of the core and armature assembly is an important feature of the invention and will next be described in detail.

Figure 4:
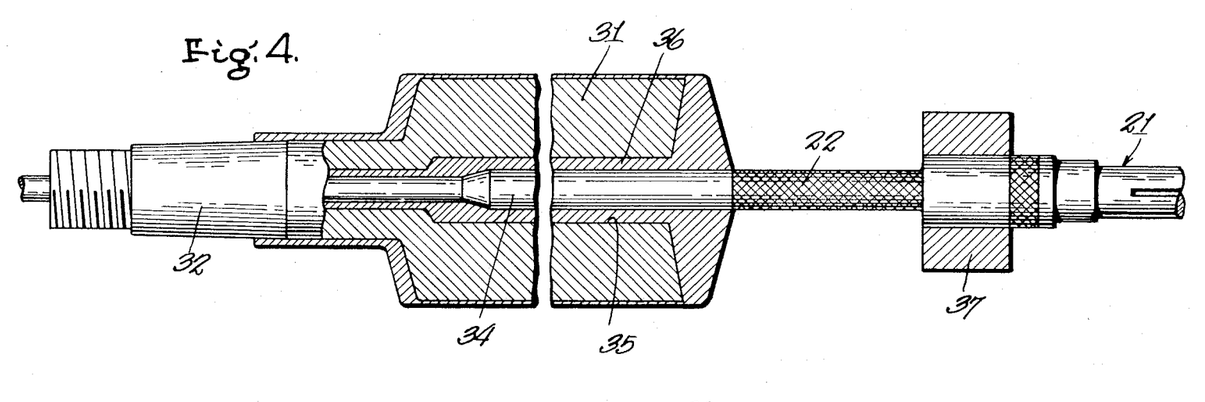
FIGURE 4 is a broken, longitudinal sectional view of certain details seen in FIGURE 2 but at an early assembly stage.

With reference now to FIGURE 4, the previously manufactured core 31 and the armature shaft 21 will be supported as shown, in concentric relation, and temporarily formed into a unitary structure by filling the core aperture 35 with a low-melting point material 36 such as lead. The lead material 36 will extend beyond the right end of the core 31 and will also cover the exterior thereof, as indicated. Moreover, a body of lead material will also be formed on the shaft 21 at 37. Conveniently, the core and armature shaft may be supported in a suitable mold, not shown, and molten lead may then be poured into the mold to provide the described assembly.

After the lead has cooled and hardened, the core-armature shaft assembly will preferably be machined, as in a lathe, especially to form the lead body 37 to a specific diameter concentric with the armature shaft, and to insure concentricity between the core 31 and its peripheral lead coating. Moreover, and as respects the thickness of the lead overlying the enlarged portion of the core such thickness will be equal to the desired running clearance between the core and the previously described armature tubular part 20. Since such clearance is desirably minimal for maximum electrical efficiency, the thickness of lead coating on the periphery of the enlarged core part will be in the nature of but a few thousandths of an inch although it is herein shown exaggerated for illustrative purposes.

Figure 5:
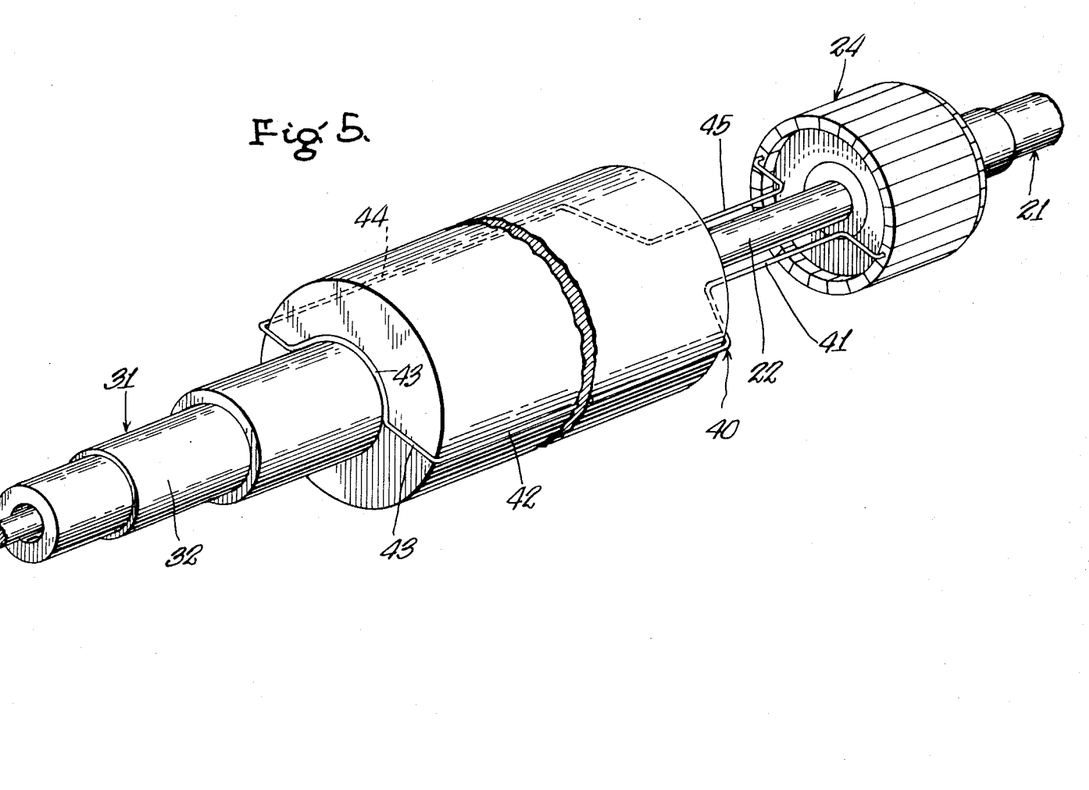
FIGURE 5 is a perspective view of the details seen in FIGURE 4 but at a later assembly stage.
Figure 6:
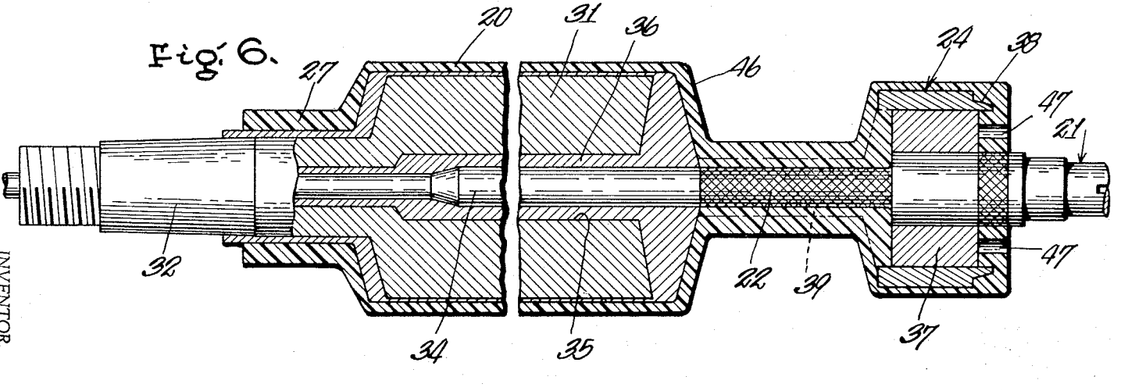
FIGURE 6 is a view similar to FIGURE 4 but at a still later assembly stage.

To the core-armature shaft-lead assembly above-described will be added the ring-like commutator assembly 24 formed in the usual manner of a plurality of electrically conductive segments which are electrically insulated from each other. Such commutator assembly will be pressed over the lead body 37 to overhang the latter at both ends as best seen in FIGURES 5 and 6, to provide pockets for reasons to appear. Preferably, and as best seen in FIGURE 6, the right end of the commutator assembly will be reduced in diameter at 38 also for reasons to appear.

Over the armature shaft portion 22, which is preferably knurled or otherwise roughened, there will next be built up, as shown in phantom lines in FIGURE 6, an uncured body 39 of glass-fiber reinforced resinous material later to be described in greater detail. Additionally, the adjoining pocket formed in part by the commutator assembly 24 will be packed with such material. Finally, the outer periphery and both ends of the lead body enclosing the enlarged portion of the core 31 may, if desired, be covered with a thin layer of the resinous material above-mentioned.

Now, and turning to FIGURE 5, the core-armature shaft-lead assembly will be wound with armature windings in a generally conventional manner. For example, an insulated armature wire 40 will be fastened to the end of one of the commutator segments, such wire 40 having a portion 41 lying along the resinous material body 39 (FIGURE 6), which has been omitted in this view in the interest of clarity, a portion 42 which extends longitudinally of the core 31, a transversely extending portion 43 which is curved about the lead coating surrounding the core portion 32, a portion 44 which extends longitudinally of the core, and a portion 45 which extends along the body 39 aforesaid and is then fastened to another, such as an opposed, commutator segment. It will be understood that the wire 40 forms a loop which lies close against the lead covered core and the body 39. If desired, wire 40 may be wrapped around the enlarged core portion several times rather than once as herein shown, to form several loops, before being connected to the aforesaid opposed commutator segment. While only one wire 40 is shown in FIGURE 5 in the interest of clarity, it will be understood that other wires will extend in a similar manner between the other commutator segments.

After all of the wires 40 have been wound as hereinabove described, a layer of the same previously-mentioned, uncured, reinforced resinous material 46 (see FIGURE 6 in which the wires 40 are omitted in the interest of clarity) will be disposed over the commutator 24 to embed the segments, over the armature shaft portion 22, the periphery of the enlarged part of the core 31 and over both ends of such enlarged core part to embed the windings 40, and over only that portion of the core part 32 which is lead-covered. Additionally, the pocket at the right end of the commutator 24 will be filled with the resinous material, as shown, to encase the adjoining portion of the shaft 21 which is also knurled or otherwise roughened. For a purpose to appear, the material in the pocket aforesaid will be pierced by one or more apertures 47 extending through to the lead body 37.

With the core-armature shaft assembly covered with the aforesaid uncured resinous material as shown in FIGURE 6, such material will next be cured to form a rigid, high-strength, light-weight body in which the wires 40 and the commutator 24 will be embedded. Since the resinous material presently employed and later to be described requires curing under heat and pressure, the assembly will next be placed in a heated mold capable of developing the requisite pressure and temperature. In the absence of a mold, that portion of the assembly covered with the resinous material may be completely wrapped with a commercially available heat shrink tape which will exert the necessary pressure when the assembly is placed in an oven or otherwise heated.

It may be noted at this point that the previously-mentioned bodies of lead or other material 36, 37 will be so chosen that their solidity will not be affected by the heat of the curing operation aforesaid.

After the resinous material has been cured and after removal of the assembly from the mold or removal of the heat shrink tape, which ever is applicable, the assembly will be machined, as in a lathe, to provide a seat for the bearing 28, to provide the necessary concentric, precise outside diameter which will insure minimum operating clearance between the armature tubular part 20 and the field poles 17, 18, and to expose the segments of the commutator 24 (see FIGURE 2). If desired, a light machining cut may be taken on other portions of the now cured resinous material to insure against rotational unbalance by providing concentricity of the material with the rotational axis of the armature shaft.

After machining the assembly as above-described, the lead material 36 and 37 will be removed, for example, by subjecting the assembly to a temperature high enough to melt the lead material. The lead material will be so chosen that its melting point will be below a temperature which would permanently impair the physical properties of the cured resinous material. Note that the lead material between the exterior of the core 31 and the interior of armature tubular part 20 may flow out through the armature tubular part 27 while the lead material within the core and between the right-hand end thereof and the adjoining resinous material may flow out through the central core aperture 35. Finally, the lead material body 37 may flow out through the previously described openings 47.

With the lead material removed, it will now be apparent that while the enlarged portion of the core 31 is enclosed within the armature tubular part 20, it is radially separated therefrom to provide the necessary operating clearance by the previously existing lead material film. Similarly, radial clearance is now provided between shaft portion 34 and the core aperture 35 while considerable lightness of the assembly has been effected by removal of the lead body 37 from the interior of the commutator assembly. Although the lead has been removed, the armature tubular part 20 is rigidly integrated with the armature shaft 21 as a result of the resinous material being both cured about the shaft portion 22, and the commutator 24 is rigidly supported at both ends by the cured resinous material.

Following lead removal, the core-armature assembly may be assembled with the other parts to provide the completed motor assembly seen in FIGURE 2.

In the present embodiment, the resinous material used is manufactured by the Minnesota Mining and Manufacturing Company of St. Paul, Minnesota, and is known as Scotchply type 1012, high temperature epoxy glass tape, and is described in a product information sheet dated January 2, 1962. As described by the manufacturer, this tape-like material comprises continuous, non-woven parallel glass filaments completely coated with uncured epoxy resin. It is to be understood, however, that other materials, possessing the requisite properties, could as well be used.

While lead has been described as used to temporarily secure together the core and the armature shaft and to coat the former, it is to be understood that alloys of lead or other metal may be employed. Moreover, while it presently appears desirable to use a low-melting point metal which is removed by heating above the melting point, materials other than metal may be found suitable and such materials may be removed other than by subjecting them to heat. For example, it may be desirable to remove the metal or other material by dissolving it in a liquid or the like which will not harm the metal core and armature shaft nor the material which embeds the windings and the commutator.

While the construction thus far described has proven to be highly efficient and quite practical, the necessity of building up the armature on the lead covered core and later removing the lead to provide operating clearance therebetween, as previously described, results in high manufacturing costs.

In an attempt to reduce manufacturing costs, the following embodiments of the invention have been devised, it being recognized that while certain of these embodiments may have somewhat more inertia than that previously described, the inertia is sufficiently low to provide the requisite fast response for many present-day commercial applications which do not require the ultimate in fast response provided by the previously described embodiment.

Figure 7:
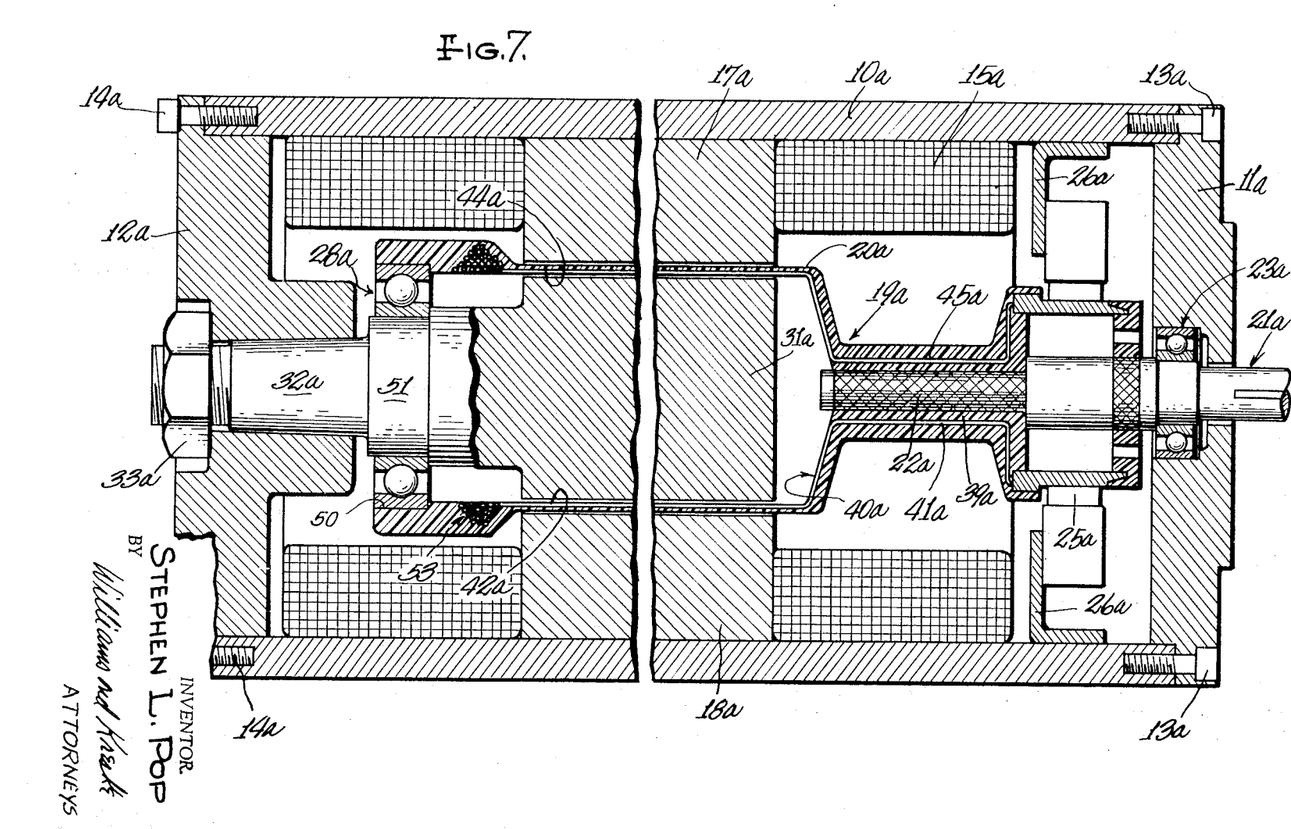
FIGURE 7 is a view similar to FIGURE 2 but of another embodiment of the invention.

The embodiment seen in FIGURE 7 is similar to that seen in FIGURE 2; accordingly, corresponding parts are identified by the same reference characters as before but with the suffix "a" added. The principal structural difference between the embodiments of FIGURES 2 and 7 is that in the latter, the left end of the armature shell is not reduced in diameter to embrace the core; accordingly, it is possible to manufacture the core and the armature separately and to later assemble them along with the remainder of the motor components thus effecting a material reduction in manufacturing costs.

Turning now to the specific structure of FIGURE 7, it will be noted that while the tubular part 20a of the armature shell has generally the same inside diameter from end-to-end thereof, except as herein disclosed, a shallow annular groove 50 is preferably formed at the left end of the shell to closely receive the outer race of the ball bearing 28a whose inner race is closely received by a portion 51 of the core 31a. Adjacent the bearing 28a, the shell 20 is radially outwardly enlarged at 52, outside of the air gap between the stator poles 18a and the core 31a, for reasons to appear.

Figures 8, 9, 10:
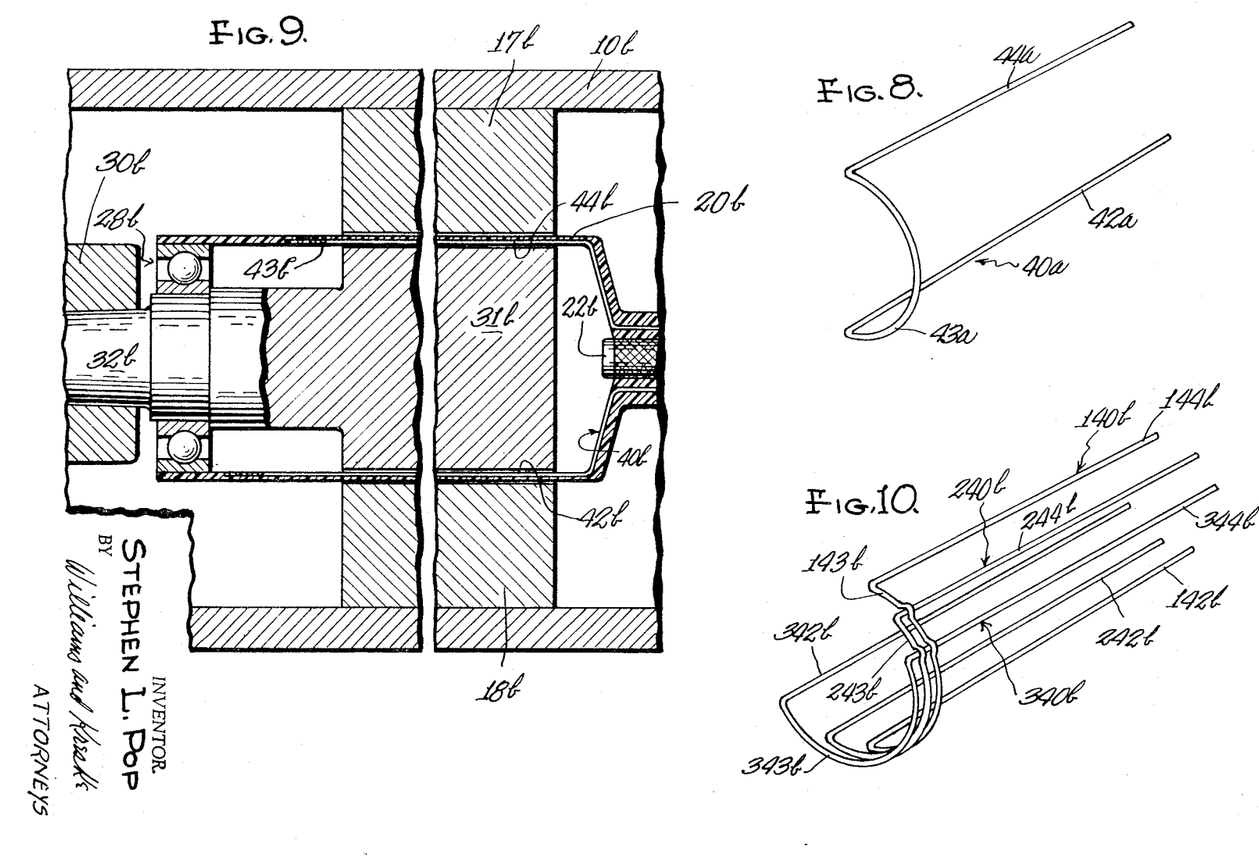
FIGURE 8 is a fragmentary perspective view of a detail seen in FIGURE 7.
FIGURE 9 is a view similar to FIGURE 2 but of another embodiment.
FIGURE 10 is a fragmentary perspective view of certain details employed in the structure of FIGURE 9.

Referring momentarily to FIGURE 8 wherein one of the armature conductor wires 40a is fragmentarily shown, such wire is similar to wire 40 previously described in that it comprises a pair of leg portions 42a, 44a extending axially of the shell 20a and spaced from each other circumferentially thereof. In the present embodiment, the leg portions of respective wires are spaced 180° apart. As before and in the position of parts viewed, the left-hand ends of the wire leg portions 42a, 44a are joined by an integral wire portion 43a; however, such portion extends entirely circumferentially of the shell rather than having parts which extend transversely thereof as is the case in the previously described embodiment. Also, although not shown, the right-hand ends of the wire legs 42a are extended for ultimate connection with the commutator 24a. While only one armature wire 40a is shown in FIGURE 8, it will be appreciated that a multiplicity of identical wires will be carried by the armature shell. Such wires will, of course, be arranged progressively about the shell with adjoining wire legs being spaced from each other circumferentially of the shell.

Referring once again to FIGURE 7, the connection portions 43a of the armature wires 40a are arranged in overlying relation outside of the air gap in which the armature shell rotates, such overlying wire portions forming a radially outwardly extending wire mass indicated by the reference character 53. It is to encapsulate such wire mass aforesaid that the shell is radially enlarged at 52 as previously described. From the foregoing, it will be evident that not only may the armature 19a and the core 31a be removed as an assembly from between the stator poles 17a, 18a by axial movement to the left, the core and the armature may also be disassembled by relative axial movement.

It has heretofore been proposed to manufacture an electric motor having a permanent magnet field (or stator) rather than an electromagnetic one as previously described. Such an arrangement, however, makes it essential that the core not be removed from between the stator poles lest they become at least partially de-magnetized. If de-magnetization occurs, special equipment is required to restore the magnetic strength of the stator poles. Since neither of the embodiments thus far disclosed would permit assembly and disassembly of the armature from position between the stator poles without removal of the core from its normal position between such poles, the embodiment seen in FIGURE 9 will be utilized.

The principal structural distinction of this embodiment over that seen in FIGURE 7, apart from the elimination of the stator windings and the use of permanent magnet poles 17b, 18b, is the elimination of the radial outward enlargement of the armature shell previously described. Since this embodiment is similar to those previously described, corresponding parts are identified by the same reference characters as before but with the suffix "b" added. The armature conductors 40b are similar to those previously described; however, the circumferentially extending conductor portions are arranged in a different manner from that disclosed in FIGURE 7, as will appear.

Referring momentarily to FIGURE 10, there is fragmentarily shown three armature conductors respectively identified by the reference characters 140b, 240b and 340b. Conductor 140b has legs 142b, 144b joined by an integral wire portion 143b, conductor 240b has legs 242b, 244b joined by an integral wire portion 243b, while conductor 340b has legs 342b, 344b joined by an integral wire portion 343b. The leg portions of the armature conductors are arranged as previously disclosed with each extending axially of the armature shell 20b and with the leg portions spaced from each other circumferentially thereof. The conductor portions 143b, 243b and 343b, of course, extend circumferentially of the shell also as previously disclosed; however, instead of such conductor portions being grouped in overlying relation as seen in FIGURE 7, such wire portions are spaced from each other axially of the armature shell as illustrated in FIGURE 10. By so spacing the conductor portions 143b, 243b and 343b, the radial enlargement of the shell seen in FIGURE 7 is avoided. While a double thickness of conductor exists where the connecting portion of one conductor crosses the leg portion of another, such double thickness will not necessarily increase overall thickness of the shell wall since the overlying plastic material of which the shell is made may be reduced at such conductor crossing places. Obviously, while only three armature conductors are shown in FIGURE 10, the armature shell will normally be formed of a much greater number of conductors spaced about the shell as shown.

With the conductors forming the armature shell as hereinabove described, it will be apparent that while some axial elongation of the armature shell 20b may be required to accommodate the axially spaced, connecting conductor portions and the bearing 28b which is frictionally seated within the shell, the left-hand end of the shell is not radially enlarged to any material extent and thus it may be removed from the air gap existing between the permanent magnet poles 17b, 18b and the core 31b merely by shifting it to the right as viewed in FIGURE 9. Thus, the armature shell 20b may be removed and replaced from the assembly without disturbing the normal relationship between the poles and the core so as not to impair the magnetic force existing therebetween.

Figure 11:
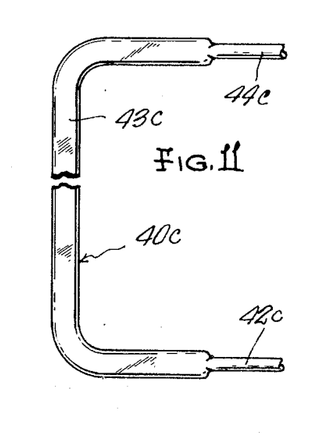
FIGURE 11 is an enlarged fragmentary plan view of a modified detail seen in FIGURE 10.

In the event the crossed armature conductors would result in a material increase in thickness of the armature shell, as when relatively heavy armature conductors are employed, the construction shown in FIGURE 11 may be employed wherein corresponding parts are identified by the same reference character as before but with the suffix "c" added. In this embodiment, each armature conductor 40c will have its connecting portion 43c and the adjoining portions of its legs 42c, 44c flattened from their normally round cross-section to reduce their thickness without reducing their cross-sectional areas. With such portions reduced in thickness an appropriate amount, the armature conductors may be crossed as heretofore disclosed without increasing armature shell thickness.

Figures 12, 13:
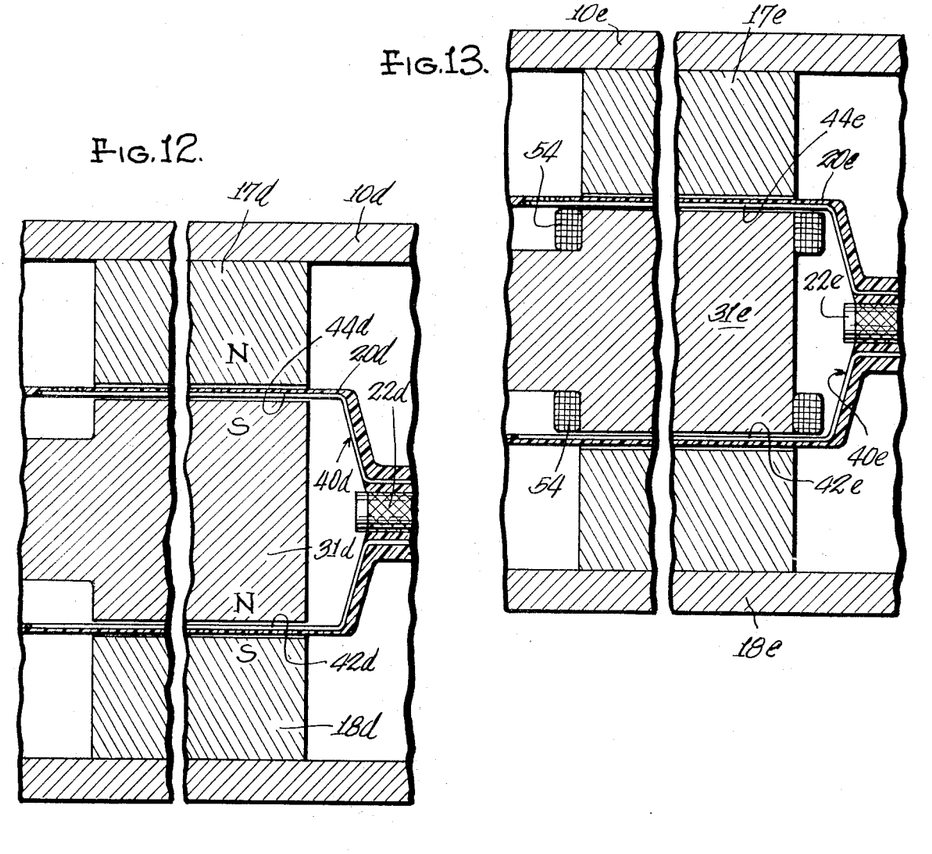
FIGURE 12 is a fragmentary view similar to FIGURE 9 but of a structure modified slightly therefrom.
FIGURE 13 is a fragmentary view similar to FIGURE 12 but of a structure slightly modified therefrom.

The embodiment of the invention fragmentarily illustrated in FIGURE 12 may be identical to that seen in FIGURE 9, with one exception hereinafter to be pointed out, and thus corresponding parts are identified with the same reference characters but with the suffix "d" added. In the embodiment of FIGURE 12, core 31d is itself a permanent magnet rather than merely being magnetically permeable as in the previously disclosed embodiments. Thus, the permanent magnetic field pole 17d may provide a north pole, the permanent magnetic field pole 18d may provide a south pole, while the core 31d may provide respective north and south poles adjacent field poles 18d, 17d respectively. By thus making the core 31d a permanent magnet also, the magnetic strength of the field is vastly increased thus greatly improving motor strength and efficiency.

While the use of a permanent magnetic core has only been shown in combination with permanent magnetic field poles, it will be appreciated that such a core could as well be used in combination with electromagnetic fields like those seen in FIGURE 7.

In the embodiment of FIGURE 13, which is similar to FIGURE 12, and thus carries the same reference characters but with the suffix "e" added, the core 31e is provided with windings 54 which make the core electromagnetic rather than permanent magnetic. Although not shown, the core 31e may be provided with a central aperture, similar to that shown at 35 in FIGURE 2, through which the leads to the windings 54 may pass. Although the field poles 17e, 18e of FIGURE 13 are herein disclosed as being permanently magnetized, it will be evident that such poles could also be electromagnetic by providing them with the necessary windings of the type seen at 15a and 16a in FIGURE 7.

Figure 14:
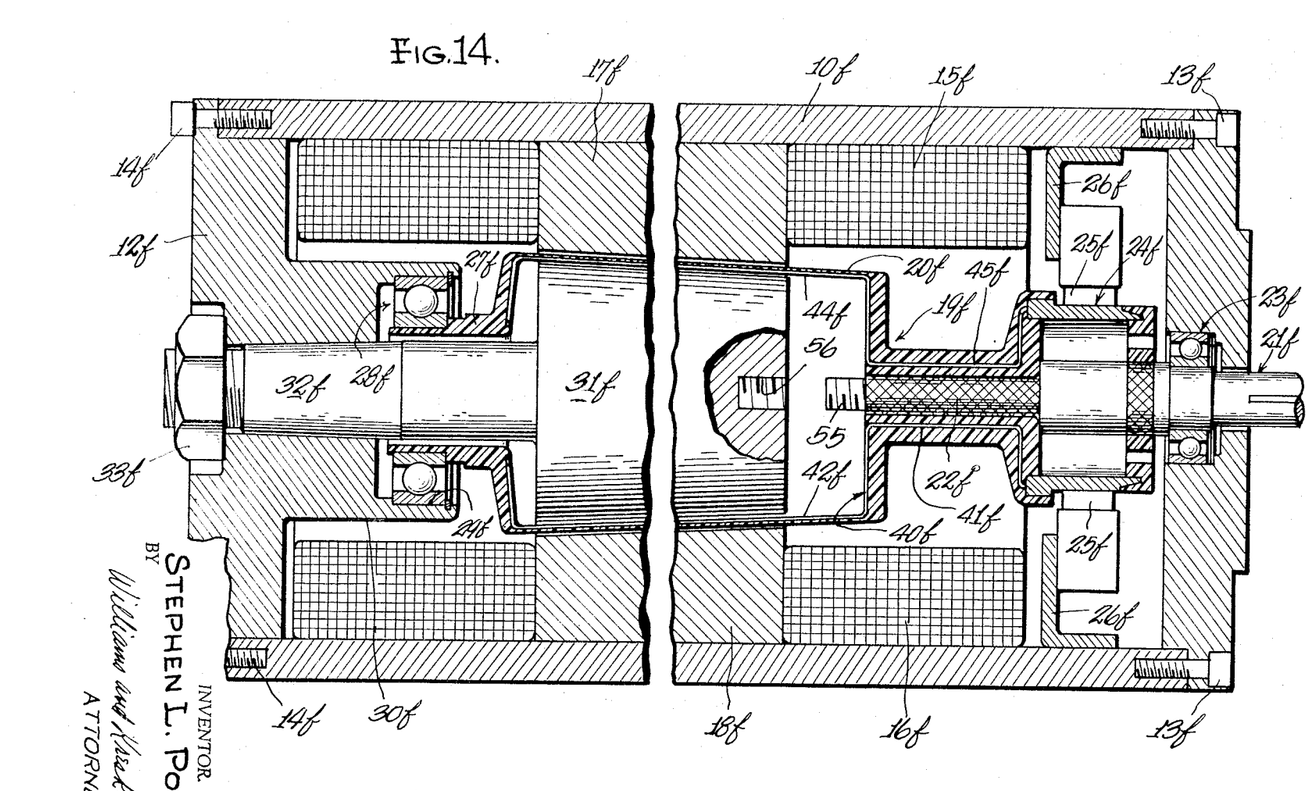
FIGURE 14 is a view similar to FIGURE 2 but of another embodiment.

The embodiment of the invention seen in FIGURE 14 is similar to that shown in FIGURE 2; accordingly, corresponding parts are identified with the same reference characters but with the suffix "f" added. The construction of FIGURE 14, while preserving the efficiency of operation of the structure of FIGURE 2 is much easier to construct and thus can be more competitively priced. In this embodiment, the armature shell 20f is slightly tapered, being larger in diameter at its left end, in the position of parts viewed, than it is at its right end. Similarly, the poles 17f, 18f and the core 32f are also correspondingly tapered to provide a uniform air gap in which the armature shell may rotate.

Figure 15:
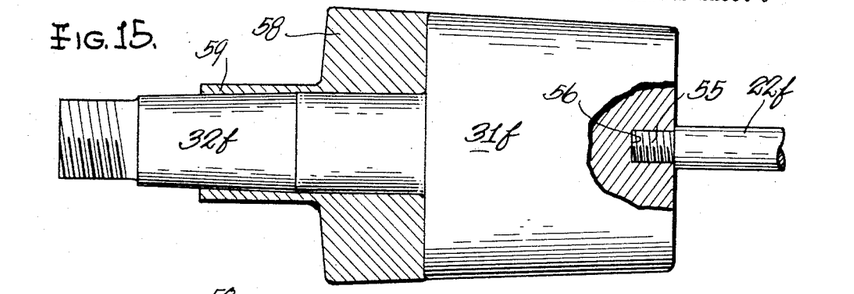
FIGURES 15 and 16 are fragmentary views of certain details seen in FIGURE 14 but at earlier stages of manufacture.

In the manufacture of the armature assembly 19f, a threaded end 55 on the armature shaft 22 will be threaded into a central threaded aperture 56 in the right end of the tapered core 32f to securely affix the two together as shown in FIGURE 15. A body of lead or the like will then be formed at the left end of the core to form an unbroken axial extension 58 of its radially enlarged portion and a radial enlargement 59 on its shank. Preferably but not necessarily, the lead will be cast upon the core 32f and then machined to provide the desired dimensional configuration. With the lead thus attached to the core, the armature will be built up on the latter and on the shaft 22f, with the conductors 40f and the resin impregnated tape, in the manner previously described with respect to FIGURE 2, and as illustrated in FIGURE 16.

After the resin in the armature has set up, the assembly will be machined to true up the armature portion which rotates in the air gap and to provide the seat for the bearing 28f. The assembly will then be subjected to sufficient heat to melt the lead, the latter escaping from between the core and the armature shell through the radial space between the latter's portion 27f and the core shank. With the lead thus removed, the core will be rotated relative to the shaft 22f in a direction to unscrew the core therefrom whereupon the latter may be relatively shifted to the left, into the space previously occupied by the lead. Clearly, by movement of the core into the larger end of the conical armature shell, radial operating clearance between the latter and the core will be provided.

Figures 16, 17:
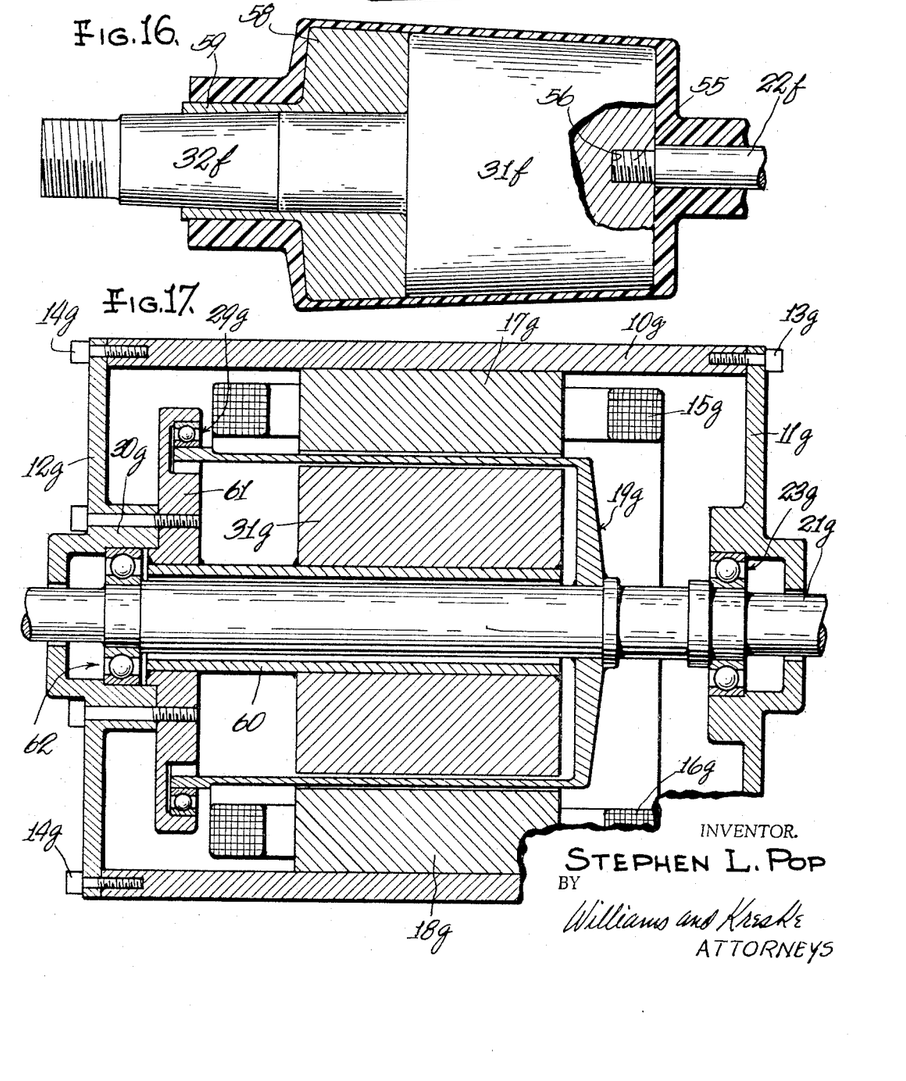
FIGURE 17 is a view similar to FIGURE 2 but of still another embodiment of the invention.

The embodiment of FIGURE 17 differs somewhat from those heretofore disclosed in that while the latter relate to direct current motors, the embodiment of FIGURE 7 relates to an alternating current motor. Nevertheless the embodiment of FIGURE 7 is similar to those previously disclosed and thus corresponding parts are identified with the same reference characters but with the suffix "g" added.

Turning now to the specific structural innovations of FIGURE 17, it will be noted that the core 31g is hollow and has an elongated tube 60 welded thereto and projecting axially therefrom. Welded to the tube 60 is a disk-like member 61 which supports the bearing 28g. Member 61 has an axial projection closely fitting within the bore in the end housing boss 30g, the latter also mounting a bearing 62 for a purpose to appear. Capscrews 63 or the like, secure the member 61 to the end housing 12g and thus maintain the core 31 in position between the poles 17g, 18g.

Shaft 21g not only is elongated to extend through the center of the tube 60, it is also rotatably supported by the bearing 62 hereinabove mentioned. Thus, either end of the shaft 21g is available for use as a power take-off shaft. Obviously, since opposite ends of shaft 21g are rotationally supported, such shaft has no less rigidity than that of a conventional electric motor.

Welded or otherwise fixedly secured to the right-hand end of shaft 21g is a cup-like armature shield 19g, whose open, left-hand end is seated within the bearing 28g previously mentioned. While shell 19g may be aluminum, it may also have conductive bars (not shown) integral therewith.

From the foregoing, operation of the embodiment seen in FIGURE 17 will be evident to one skilled in the art; in brief, however, the rotating magnetic field produced by the coils 15g, 16g causes the shell 19g and its attached shaft 21g to rotate therewith. It will thus be recognized that the embodiment of FIGURE 7 functions on the dragcup or eddy current principle; however, as distinguished from prior art devices employing this principle, this embodiment lends itself to much wider use because its rotating parts are so much more rigidly supported.

In view of the foregoing it will be apparent to those skilled in the art that I have accomplished at least the principal object of invention and it will also be apparent to those skilled in the art that embodiments herein described may be variously changed and modified, without departing from the spirit of the invention, and that the invention is capable of uses and has advantages not herein specifically described; hence it will be appreciated that the herein disclosed embodiments are illustrative only and that my invention is not limited thereto.

I claim:

1. A low inertia electric motor comprising spaced housing members, a stator between said housing members, a core having a cylindrical first portion within said stator proportioned to provide a radial space therebetween, said core terminating short of one of said housing members and having a reduced second portion anchored to the other of said housing members, an output shaft concentric with and smaller in diameter than said core, said shaft extending through said one housing member and being rotatably carried thereby, and an armature having a tubular portion in the radial space between said stator and said core and such armature portion having radial operating clearance over both, said armature tubular portion having electrical conductors extending longitudinally thereof and structurally integral therewith and forming a part thereof, said conductors being disposed closer to the inner surface of said armature tubular portion than to the outer surface thereof to provide for maximum strength of said armature tubular portion in resisting centrifugal forces which tend to cause radial outward movement of said conductors during armature rotation while minimizing wall thickness of said armature tubular portion, said armature having radially inwardly extending end portions which enclose said core first portion while being axially spaced therefrom and said armature end portions being integral with said armature tubular portion to provide a unitary structure of maximum strength with minimum wall thickness and minimum mass, one of said armature end portions being anchored to said shaft for unitary rotation therewith and said other armature end portion having radial operating clearance over said core second portion.

2. The construction of claim 1 wherein said conductors are embedded in said armature tubular portion.

3. The construction of claim 1 wherein a bearing is engaged with said other armature end portion and rotatably supports the latter.

4. The construction of claim 1 wherein said other armature end portion has an integral part extending in an axial direction toward said other housing member, and wherein a bearing is engaged with said axially extending part of said armature for rotatably supporting the latter.

5. The construction of claim 4 wherein said bearing is of the anti-friction type having relatively rotatable, inner and outer races and wherein said inner race is mounted upon the exterior of said axially extending armature part.

6. The construction of claim 5 wherein the outer race of said bearing is seated within a recess formed in said other housing member.

7. The construction of claim 6 wherein a commutator is anchored to said output shaft adjacent said one housing member and wherein said electrical conductors are connected to said commutator.

8. A low inertia electric motor comprising spaced housing members, a stator between said housing members, a cylindrical core within said stator proportioned to provide a radial space therebetween, said core terminating short of one of said housing members and being anchored to the other of said housing members, an output shaft concentric with and smaller in diameter than said core, said shaft extending through said one housing member and being rotatably carried thereby, an armature having a radially inwardly extending portion axially spaced from said core and anchored to said output shaft to provide for unitary rotation of said armature therewith, electrical conductors extending longitudinally of said armature tubular portion and being structurally integral therewith to form a part thereof, said conductors being disposed closer to the inner surface of said armature tubular portion than to the outer surface thereof to provide for maximum strength of said armature tubular portion in resisting centrifugal forces which tend to cause radial outward movement of such conductors during armature rotation while minimizing wall thickness of said armature tubular portion, and bearing means adjacent said other housing member and rotatably supporting the adjoining armature portion.

9. The construction of claim 8 wherein a commutator is carried by and rotatable with said output shaft, wherein each electrical conductor has a pair of leg portions joined by a connecting portion, wherein it is the conductor leg portions which extend longitudinally of said armature, and wherein each conductor connection portion extends circumferentially of said armature.

10. The construction of claim 9 wherein certain of said electrical conductors are in overlying relation with certain other electrical conductors, wherein those portions of the electrical conductors which are in overlying relation are disposed outside of the radial space aforesaid, and wherein said electrical conductors are overlaid to avoid any reduction in the internal diameter of said armature.

11. The construction of claim 10 wherein said overlaid electrical conductor portions form a radial outward enlargement on said armature.

12. The construction of claim 9 wherein said stator and said core provide a permanent magnetic field, and wherein the portion of said armature carrying said electrical conductor connecting portions has substantially the same inside and outside diameter as other armature portions disposed in the radial space aforesaid to provide for assembly and disassembly of said armature between said core and said stator without disturbing the physical relationship between the latter and said core.

13. The construction of claim 12 wherein said electrical conductor connecting portions are spaced from each other longitudinally of said armature.

14. The construction of claim 13 wherein certain of said electrical conductor connecting portions overlie certain electrical conductor leg portions and wherein certain of said electrical conductor portions are flattened to reduce their thickness without affecting their cross-sectional area thus minimizing thickening of said armature at the places where said electrical conductors are overlaid.

15. A low inertia electric motor comprising axially spaced housing members, a stator between said housing members, a core having a magnetically permeable portion within said stator and said core being carried by one of said housing members and projecting toward but terminating short of the other, said core portion being transversely larger at one end than at the other and said stator being proportioned relative to said core to provide a radial space therebetween of generally uniform thickness, an output shaft rotatably carried by said other housing member in concentric relation with said core, a hollow armature shell around said core and disposed in the radial space between the latter and said stator, said armature shell having electrical conductors extending longitudinally thereof and structurally integral therewith and forming a part thereof, said conductors being disposed closer to the inner surface of said armature shell than to the outer surface thereof to provide for maximum strength of said armature shell in resisting centrifugal forces which tend to cause radial outward movement of said conductors during armature rotation while minimizing wall thickness of said armature shell, said armature shell being carried by and unitarily rotatable with said shaft and said shell having one end of greater diameter than the other to fit within the radial space aforesaid with but minimum operating clearance over both said core and said stator, and bearing means at the other end of said armature shell and rotatably supporting the latter.

16. The construction of claim 15 wherein the largest diameter portion of said armature shell is adjacent said one housing member, and wherein said shaft and said core have axially spaced portions adapted to cooperate with each other in connecting said core and said shaft together in predetermined fixed relation during formation of said armature shell.

17. The construction of claim 16 wherein one of said axially spaced portions is externally threaded while the other is interally threaded.

18. A low inertia electric motor comprising axially spaced housing members, a magnetically permeable core carried by and supported solely by one of said housing members and projecting toward but terminating short of the other, a stator between said housing members for receiving said core and being proportioned to provide a radial space therebetween, an output shaft rotatably carried by said other housing member in concentric relation but free of connection with said core, a cup-shaped rotating shell around said core and in the radial space between the latter and said stator poles and said shell having an internal diameter from its closed end to its open end slightly larger than the transverse size of said core and an external diameter between its ends slightly smaller than the transverse space between said poles to provide radial operating clearance thereover, the open end of said shell being disposed adjacent said one housing member and the closed end of said shell being disposed adjacent said other housing member and said shell closed end being affixed to said output shaft for unitary rotation therewith, said shell having electrical conductors extending longitudinally thereof and structurally integral therewith and forming a part thereof, said conductors being disposed closer to the inner surface of said shell than to the outer surface thereof to provide for maximum strength of said shell in resisting centrifugal forces which tend to cause radial outward movement of said conductors during shell rotation while minimizing wall thickness of said shell, and bearing means carried by said one housing member and mounted directly on said shell at its open end for rotatably supporting the latter.

References Cited

UNITED STATES PATENTS

| | | | |
|---|---|---|---|
| 2,759,116 | 3/1956 | Glass | 310—266 |
| 2,832,908 | 4/1958 | Abbott | 310—266 |
| 2,849,630 | 8/1958 | Waloff | 310—266 |
| 2,860,267 | 11/1958 | Hayes | 310—266 |
| 3,102,964 | 9/1963 | Bennett | 310—266 |

FOREIGN PATENTS

| | | |
|---|---|---|
| 673,793 | 6/1952 | Great Britain. |

MILTON O. HIRSHFIELD, *Primary Examiner.*

J. W. GIBBS, *Assistant Examiner.*